I. W. KEITHLEY.
SADDLE ATTACHMENT.
APPLICATION FILED NOV. 19, 1920.
1,397,128.
Patented Nov. 15, 1921.
3 SHEETS—SHEET 1.
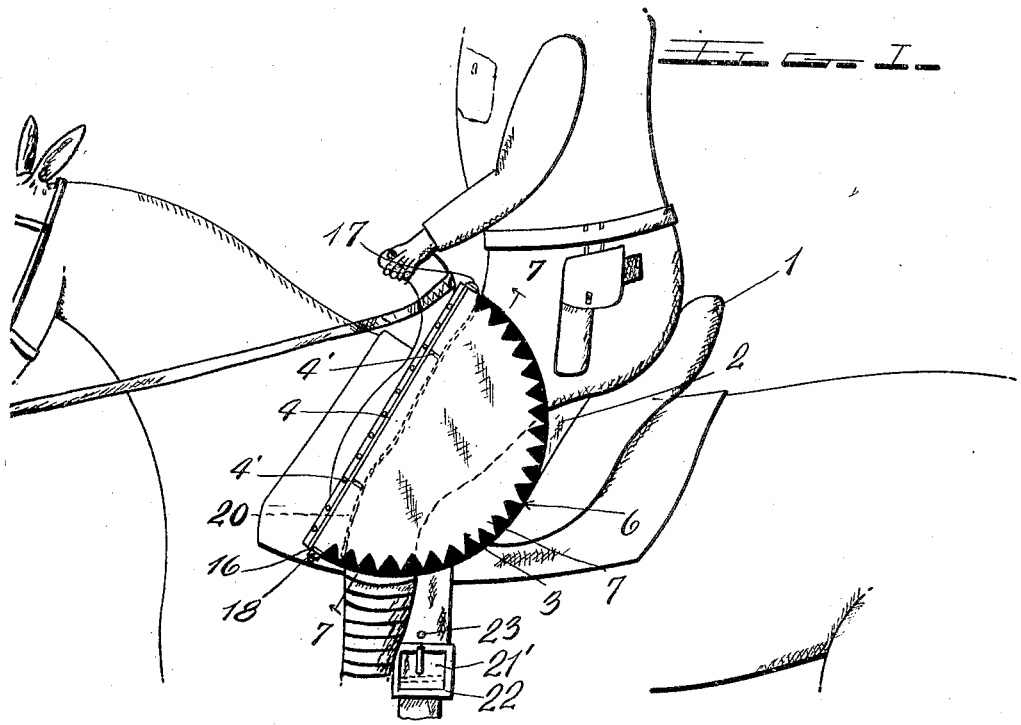
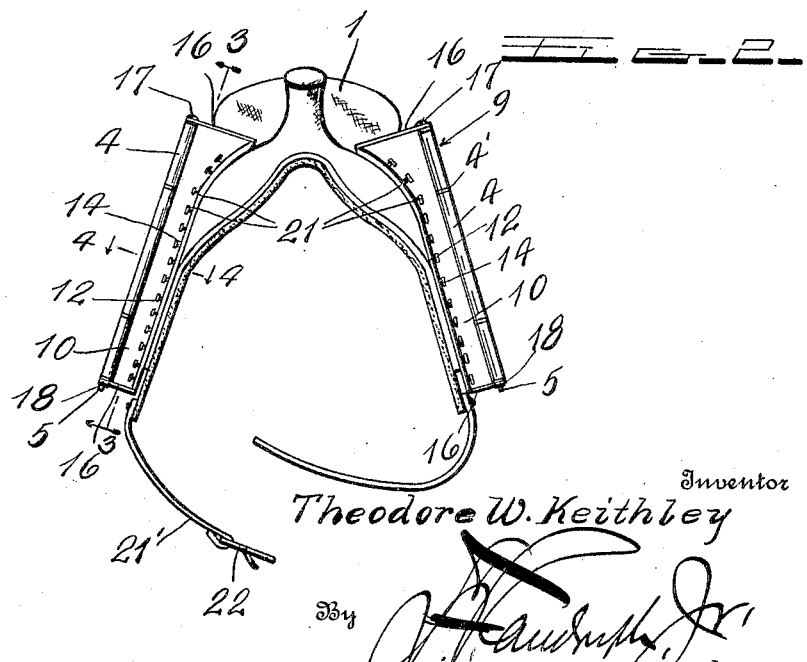
Witness
J. R. Hoge
Inventor
Theodore W. Keithley
By
Attorney

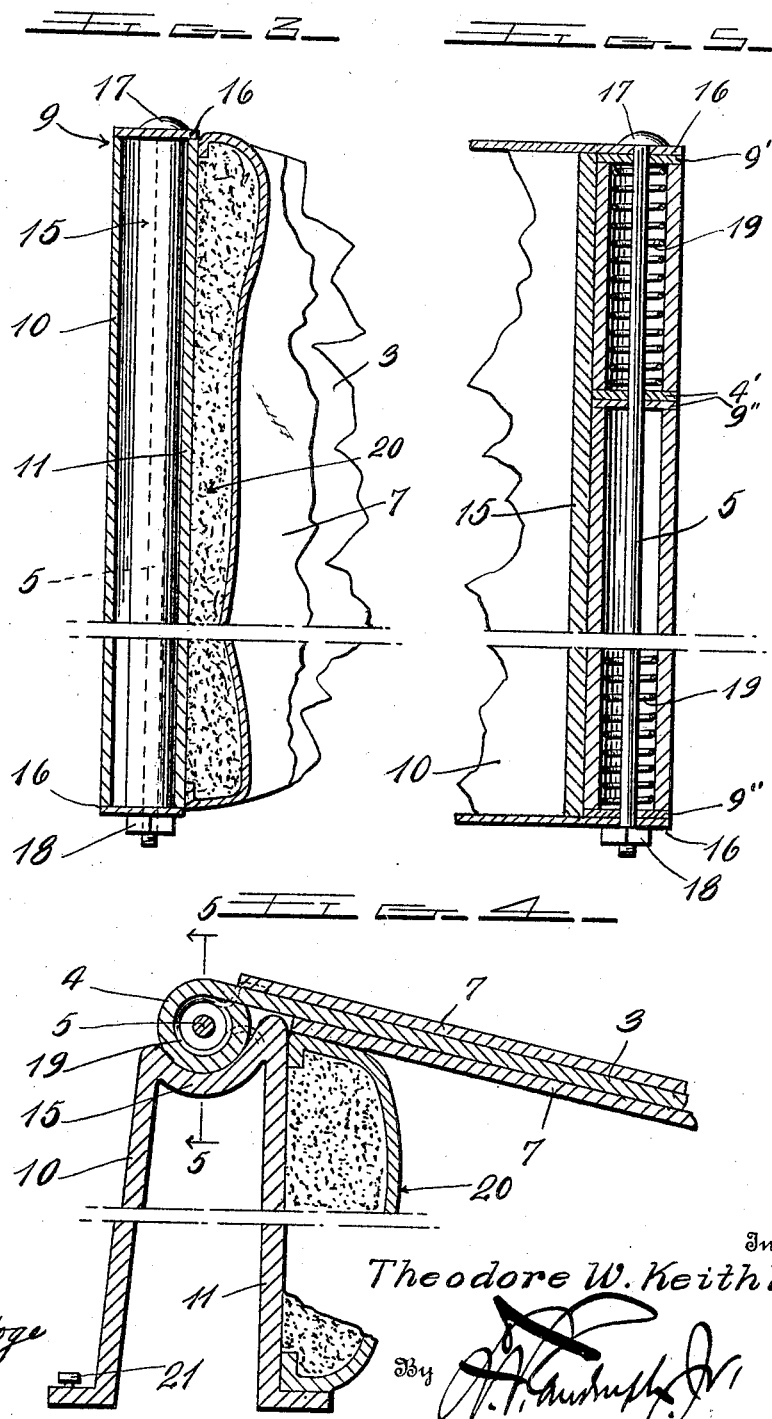

T. W. KEITHLEY.
SADDLE ATTACHMENT.
APPLICATION FILED NOV. 19, 1920.
1,397,128.
Patented Nov. 15, 1921.
3 SHEETS—SHEET 3.
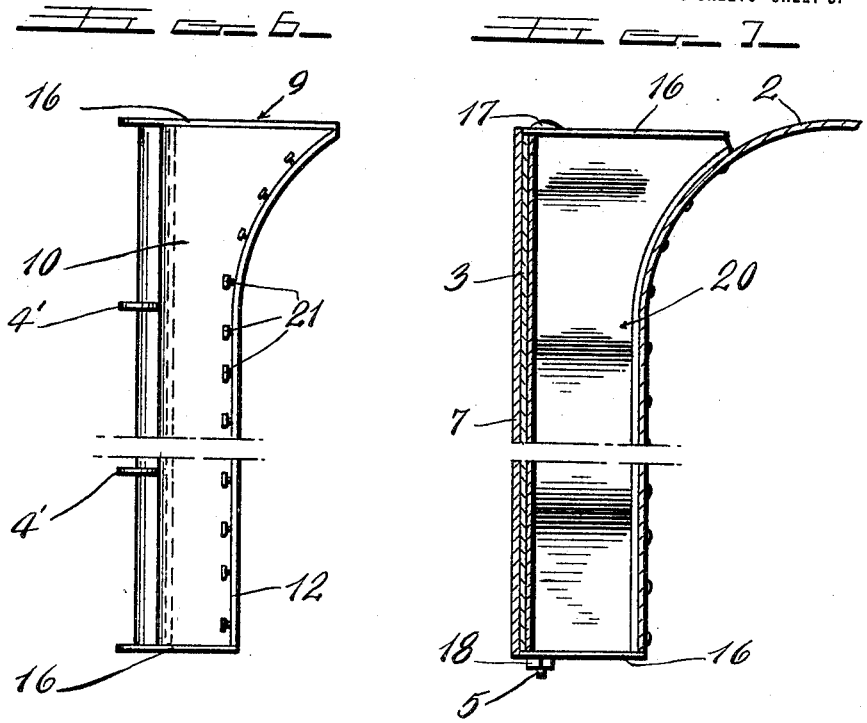
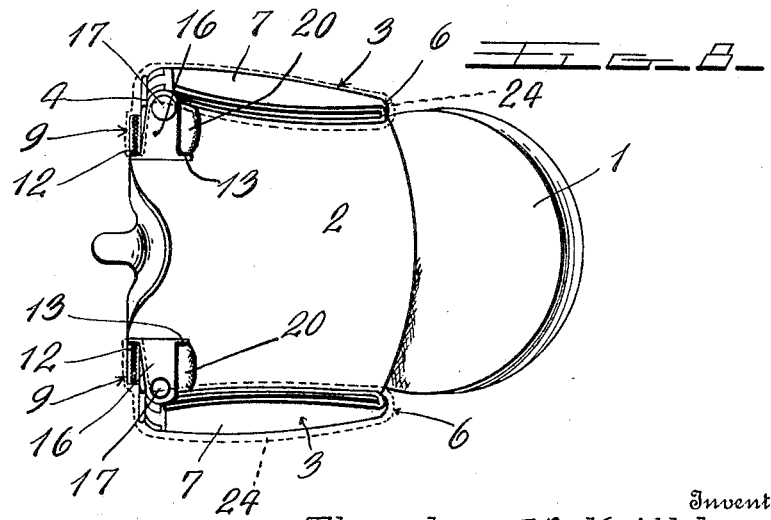
Witness
J.R. Hoge
Inventor
Theodore W. Keithley
By
Attorney

UNITED STATES PATENT OFFICE.

THEODORE W. KEITHLEY, OF BIGTIMBER, MONTANA.

SADDLE ATTACHMENT.

1,397,128. Specification of Letters Patent. Patented Nov. 15, 1921.

Application filed November 19, 1920. Serial No. 425,138.

*To all whom it may concern:*

Be it known that I, THEODORE W. KEITHLEY, a citizen of the United States, residing at Bigtimber, in the county of Sweet Grass and State of Montana, have invented certain new and useful Improvements in Saddle Attachments; and I do hereby declare the following to be a full, clear, and exact description of the invention, such as will enable others skilled in the art to which it appertains to make and use the same.

This invention relates to certain new and useful improvements in a saddle attachment and has for its primary object the provision of a saddle attachment which will be of simple construction and composed of the minimum number of parts and will yet serve to protect the legs of the rider from rain, snow or the like and also from injury by brush or the like when traveling over rough country.

The invention has for another object the provision of a saddle attachment of the character stated which will be constructed in such a manner as to provide limb protecting devices on either side of the saddle, between which limb protecting devices and the sides of the saddle may be received the limbs of the rider and which thoroughly protect the limbs of the rider from a point below the knee to the thigh.

A further object of the invention resides in the provision of an attachment of the character stated which may be readily mounted on a saddle of conventional form and secured thereto, the supporting member of the attachment conforming to the shape of the side of the saddle and the side of the animal so that the hinged projecting leaf will be properly supported.

The invention has for a still further object, the provision of a saddle attachment of the character stated in which the hinged limb protecting leaf will be resiliently retained in proper positions to engage the outer side of the limb of the rider without clamping the limb between the leaf and the saddle.

The invention has for a still further object the provision of a saddle attachment of the character stated in which the side of the character stated in which the side leaves and their supporting members may be connected on opposite sides of the saddle by transverse straps extended across the saddle and each supporting member having pads upon its inner or rear side face to be engaged by the knee and the upper portion of the leg of the rider, thereby assisting the rider in retaining his position upon the saddle by pressure of the pads against his limbs.

The invention has for still another object, the provision of a saddle attachment of the character stated in which protecting caps will be provided at the upper and lower ends of the supporting members for the leg protecting leaves to prevent the entrance of rain or dirt at the opposite ends of the hinge pins for the leaves.

The invention has for a further object the provision of a saddle attachment of the character stated which will make it unnecessary for the rider to wear chaps, as is the custom of stockmen and ranchmen and which saddle attachment will add to the safety of the rider.

Still another object of the invention resides in the provision of a saddle attachment of the character stated which will not only have the novel manner of hinging the side leaves to the supporting members provided therefor and a novel form of pad to be engaged by the upper portion of the leg or the side of the rider but which attachment will be so constructed that it may be mounted upon the animal over a saddle or without employing the saddle, if desired.

With the foregoing and other objects in view, as will appear as the description proceeds, the invention consists in the novel construction, combination and arrangement of coöperating elements as hereinafter more specifically set forth, shown in the accompanying drawings forming a part of the present application and claimed.

In the drawings:

Figure 1 is a side elevation showing the attachment in use,

Fig. 2 is a front elevation of a saddle with the attachment applied thereto,

Fig. 3 is a vertical section on the plane of line 3—3 of Fig. 2, looking in the direction indicated by the arrow, Fig. 4 is a transverse section on the plane of line 4—4 of Fig. 2, looking in the direction indicated by the arrow, Fig. 5 is a vertical section on the plane of line 5—5 of Fig. 4, Fig. 6 is a detail view of one of the supporting members, Fig. 7 is a vertical transverse section on the plane of line 7—7 of Fig. 1, looking in the direction indicated by the arrows, Fig. 8 is a top plan view of the saddle with the attachment applied thereto.

Referring more in detail to the drawings in which similar reference characters designate corresponding parts throughout the several views, 1 indicates a saddle of conventional form and which is shown in Fig. 1 of the drawings as being applied to an animal with a rider on the saddle, and my attachment carried by the saddle.

In order to apply my attachment to the saddle I employ a strap or band 2 which extends across the saddle and upon which the attachment is secured to opposite sides of the saddle, as shown clearly in the drawings. The attachment includes a hinged limb covering and protecting side leaf 3 for each side of the saddle. Each leaf includes a vertical forward edge rolled upon itself to provide the sectional barrels for inclosing spring members 4 which coöperate with the hinge ears 4' adapted to receive the hinge pin 5, as will be later fully set forth. Each leaf 3 also has a curved or arcuate edge 6 connected at its opposite ends with the upper and lower ends of the forward vertical edge, as will be clearly understood by referring to the drawings. This leaf 3 may be formed of metal covered on both faces or on one face, only, if preferred, with leather, cloth, or the like, as shown at 7. This covering 7 may be plain or ornamented, as indicated in the drawings to add to the attractiveness of the attachment. This, however, is not essential as the attachment may be finished in any suitable and well known manner.

In order to support each leaf 3 I have provided on each side of the saddle a supporting member which will be designated in general by the numeral 9 and which is of substantially U-shape construction in cross section, forming an outer plate 10 and an inner plate 11 with out-turned flanges or free longitudinal edges 12 and 13, respectively. These flanges 12 and 13 are provided with suitable openings to receive securing members 14 by means of which the supporting member 9 may be readily secured in position upon the strap 2 so that the supporting member will be extended in vertical position along the forward edge of the saddle 1. It will be understood that the outer plate 10 and inner plate 11 diverge from one another from their outer or connected edges to their flanged edges and the plates 10 and 11 are wider at their upper ends than at their lower ends and the flanges 12 and 13 curve longitudinally so that the supporting member 9 may conform to the curvature of the saddle 1 and the animal upon which the saddle is positioned, at the same time presenting vertical outer edges for the plates 10 and 11 connected by the transversely curved connecting portions 15. The outer plate 10 is narrower from its inner to its outer edge than the inner plate 11, throughout the length of the plates 10 and 11, so as to receive the ears 4' and rolled spring inclosing members 4 at the edge of the leaf 3 and permit proper swinging movement of the leaf 3 upon the pin 5 within the concaved or transversely curved connecting portion 15 of the supporting member or bracket 9, as will be clearly understood by referring to Figs. 1, 2 and 4 of the drawings. The pin 5 is properly supported in position by means of the caps or covering plates 16 positioned on the upper and lower ends of the supporting member or bracket 9 for closing said upper and lower ends, said caps or closure plates 16 having ends extended over the ends of the rolled or turned edge of the leaf 3 and perforated to receive the hinge pins 5. A suitable head 17 is formed on one end of the hinge pin 5 while a nut 18 or the like is removably mounted on the opposite end thereof. The hinge pin 5 also extends through the rolled member and the perforated hinge ears 9" formed in the transversely curved connecting portion 15 of the supporting member 9 and which are adapted to interlock with the hinge members 4 or spring inclosing members and the hinge ears 4' of the leaf 3 when the latter is mounted on the supporting member 9. The hinge pin 5 also has a pair of helical springs 19 extended around its opposite end portions within the spring inclosing hinge members 4. One end of each spring 19 is secured to one of the inclosure plates 16 while its opposite end is secured to the end of the spring inclosing member 4 of the leaf 3. The springs 19 are so positioned that they normally retain the leaf 3 in its closed position against the side of the saddle 1 or against the outer side of the limb of the rider, when the latter is mounted upon the saddle 1, as shown in Fig. 1 of the drawings. The springs 19 will permit the leaf 3 to be swung outwardly and forwardly from the normal position to permit insertion or removal of the limb of the rider. The supporting member or bracket 9 may be formed of a suitable metal and is preferably constructed in the manner shown and described, although this may be varied as desired.

The roll or pad 20 is preferably secured to the inner face of the inner plate 11 of the supporting member or bracket 9 adjacent the upper end thereof or upper edge and is of such size and shape as to extend over the thigh of the rider's limb when the rider is mounted, thereby providing a pad against which the thigh may be pressed to assist the rider in retaining the position upon the saddle, when required. The pad 20 may be formed of leather filled with cotton or some other suitable material or if preferred, the pad may be constructed in some other manner and of a different material. The roll or pad 20 should conform somewhat to the shape of the upper portion of the leg and thigh of the rider and thereby reduce liability of the rider being thrown upwardly sufficiently to cause the rider to completely leave the saddle 1. See Fig. 3.

In order that a canvas cover 24 may be drawn over the leaf 3 to protect the same, I have provided a plurality of buttons 21 on the outer face of the outer plate 10 of the supporting or bracket member 9, so that the canvas cover (not shown) may be readily secured in position as will be understood by parties familiar with this art.

It will be understood that the attachment may be employed either with the saddle, as illustrated or without the saddle if desired. The lower edges of the strap or band 2 may be connected as shown in the drawings, by a transverse under strap or belly band 21' formed in two sections secured to the opposite lower edges of said strap or band 2 and connected by the buckle 22 carried by one section and passing through one of the openings 23 in the other section of the strap 21' to retain the attachment in proper position. It will therefore be evident that this lower strap or belly band 21' may be employed to secure the attachment in proper position upon the animal, to advantage, when the saddle is omitted.

While the preferred embodiment of the invention has been shown and described, it will be understood that minor changes in the details of construction and arrangement of parts may be resorted to within the scope of what is claimed without departing from the spirit of the invention.

What is claimed is:—

1. A saddle attachment comprising leg protecting leaves, brackets for mounting said leaves upon opposite sides of a saddle and in spaced relation thereto, means for resiliently forcing the free edges of said leaves toward the sides of said saddle, and cushioning means carried by the mounting means for said leaves.

2. A saddle attachment comprising leg protecting leaves, brackets for supporting said leg protecting leaves, hinge pins for said leg protecting leaves, hinge ears carried by said brackets and said leaves to receive said hinge pins, said leaves being adapted to swing on said hinge pins, means for normally retaining said leaves in engagement with the side of the saddle, and means for supporting the brackets on opposite sides of the saddle.

3. A saddle attachment comprising a supporting strap adapted to be positioned transversely over the saddle, means for connecting the lower ends of said strap, a pair of bracket members secured to the supporting strap on opposite sides of the saddle and along the lower edge thereof, said bracket including vertical transverse outer portions, hinge pins mounted in said outer portions of the brackets, hinge members to receive said hinge pins, leg supporting leaves mounted on said hinge pins and means for resiliently retaining said leaves in engagement with the sides of the saddle.

4. A saddle attachment comprising a pair of supporting brackets including diverging plates, said plates having outwardly turned flanges formed at their diverging edges, means to secure said flanges upon opposite sides of the saddle, hinge pins mounted in the outer vertical edges of the supporting brackets, leg protecting leaves mounted on said hinge pins, means to resiliently retain said leaves in their innermost position, closure caps for the opposite ends of the supporting brackets, said closure caps being adapted to support the hinge pins, hinge members carried by said supporting brackets and said leaves to receive said hinge pins, means engaged around said hinge pins within certain of said hinge members to resiliently retain said leaves in operative position, and pads carried on the inner side of the supporting brackets conforming to the shape of the upper portion and thighs of the legs of a rider and adapted for engagement by the same to assist the rider in retaining position on the saddle.

5. A saddle attachment comprising leg protecting leaves, supporting members for mounting said leg protecting leaves on the sides of the saddle, and pads carried by said supporting members for engagement by the thigh portion of the legs of a rider in the saddle.

6. A saddle attachment comprising supporting members mounted on opposite sides of the saddle, pads carried by said supporting members for engagement by the thigh portion and knees of the legs of a rider in the saddle, and leg engaging and protecting means hinged to said supporting members for engagement with the outer sides of the rider's legs.

In testimony whereof I affix my signature in presence of two witnesses.

THEODORE W. KEITHLEY.

Witnesses:
   J. B. SELTERS,
   H. T. KEITHLEY.